United States Patent [19]
Rössig

[11] 3,843,298
[45] Oct. 22, 1974

[54] APPARATUS FOR MANUFACTURING FINISHED PRODUCTS FROM CONTINUOUSLY ADVANCING LAYERS

[75] Inventor: Manfred Rössig, Neu-Isenburg, Germany

[73] Assignee: Redland Tiles, Ltd., Reigate (Surrey), Great Britain

[22] Filed: Sept. 20, 1973

[21] Appl. No.: 399,451

Related U.S. Application Data

[60] Continuation of Ser. No. 152,434, June 11, 1971, abandoned, which is a division of Ser. No. 826,993, May 22, 1969, abandoned.

[30] Foreign Application Priority Data
May 22, 1968 Germany.............................. 1759639
May 8, 1969 Germany.............................. 1923437

[52] U.S. Cl.................... 425/296, 83/326, 83/327, 83/337, 425/307, 425/373

[51] Int. Cl............................................. B28b 11/14
[58] Field of Search...... 425/296, 307, 373; 83/326, 83/327, 328, 337

[56] References Cited
UNITED STATES PATENTS
2,023,291  12/1935  Roth................................ 83/326 X
2,784,784  3/1957  Haumann......................... 83/326 X
3,708,954  1/1973  Wilke et al. ..................... 83/327 X

*Primary Examiner*—Frank T. Yost
*Attorney, Agent, or Firm*—Edwin E. Greigg

[57] ABSTRACT

The invention relates to a completely synchronized machine for moving a horizontal array of abutted molds past a mechanism arranged to deposit on said molds a uniform layer of moist material which is subsequently severed transversely at precise intervals where the edges of the molds are juxtaposed.

11 Claims, 15 Drawing Figures

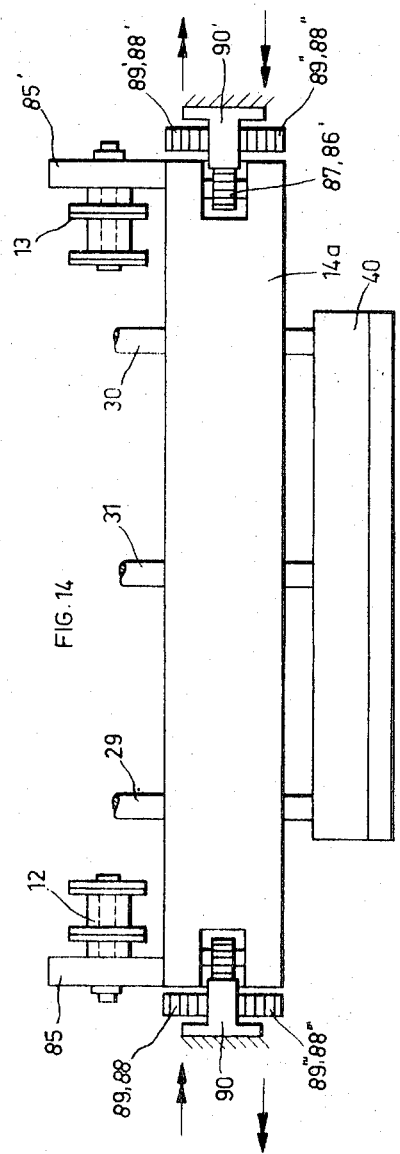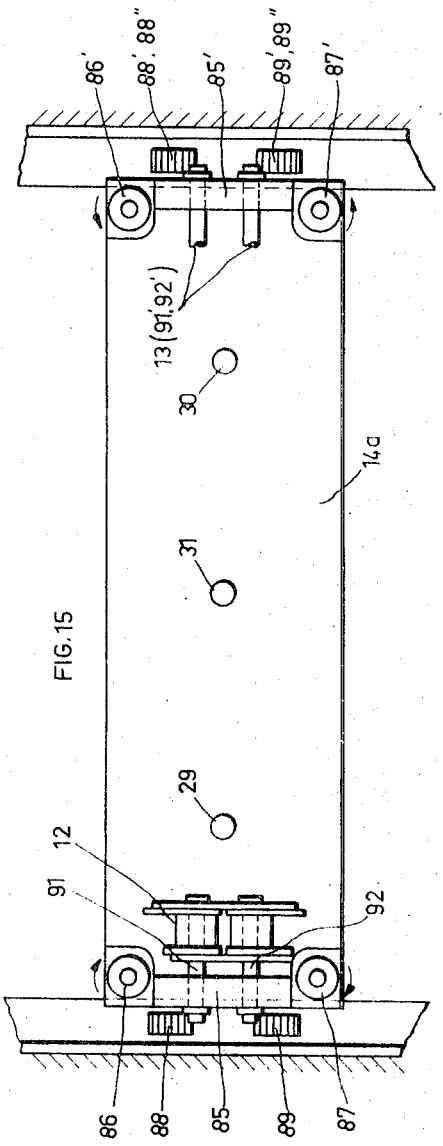

the tools, which is controlled either mechanically or electro-pneumatically by way of cams, as well as the path and the velocity may thus be brought into coincidence with respect to each other. The distance between the conveying means or device and the processing device is so chosen that at the time the tools are lowered into the layer of cement, the correct spot is automatically engaged so that processing is carried out in the place where two bottom molds abut against each other.

APPARATUS FOR MANUFACTURING FINISHED PRODUCTS FROM CONTINUOUSLY ADVANCING LAYERS

This is a continuation of application Ser. No. 152,434 filed June 11, 1971, and now abandoned, which in turn was a divisional application of Ser. No. 826,993, filed May 22, 1969, and now abandoned.

BACKGROUND OF THE INVENTION

1. Field of the Invention

The invention relates to an improved system for advancing a series of molds in a horizontal plane under an apparatus provided with cementitious material which is extruded in a controlled smooth layer on the moving molds and includes means for thereafter continuously severing the cementitious material by a circulating conveyor carrying a plurality of knives before it hardens into predetermined lengths with the entire organization of elements being synchronized to produce an outstanding finished product.

2. Description of the Prior Art

During the manufacture of roof tiles, particularly cement roof tiles, the fresh cement, as is well known, is supplied by means of a funnel into bottom-half molds, so-called pallets, which pass under the funnel. Known also in the art are the conveyor devices for the bottom molds which are joined together to form a continuous layer or line. Filling and packing of the fresh cement onto the bottom half molds is carried out in a continuous operation while the bottom half molds pass by under the lower funnel end at a more or less uniform speed. For the purpose of making roof tiles, for example, cement roof tiles or bricks, of the known type, the cement layer must be treated or processed by means of a device, for instance, it must be cut in those places where two bottom molds each come together.

Already known in the art for processing or treating cement are, for example, cutting devices which are moved to and fro in an oscillating fashion. The drive and control relative to the movement of the tool carrier or slide are effected mechanically by way of rod and cams. The movement of the tool is generally carried out electro-pneumatically. The problem, when processing the cement layer, consists in conveying the tools at the same horizontal speed with which the layer is moved so that they can be lowered into the cement at the right spot and at the right moment. During a specific period of time, and hence for a certain path, the tool remains in the cement layer until it is removed therefrom. During this period of time and, respectively, for this path, the speed of the tool, which latter also moves forwardly, must coincide with the cement layer with respect to its feeding path and feeding velocity since inaccurately processed edges or surfaces would otherwise be produced.

This problem of the coinciding velocities has been solved in the prior art devices by virtue of the fact that rods and dies which are rigidly connected with the conveying means operating in an oscillating manner, press, during the prestroke movement along a certain path, upon levers which are mechanically connected with the tool carrier or slide. In this manner the prestroke movement is transmitted from the conveying device to the tool carrier or slide. The precise moment of lowering the tools, which is controlled either mechanically or electro-pneumatically by way of cams, as well as the The disadvantage of these known devices consists, however, in the oscillating movement itself since in the conveying device and also in the processing device, for example in the cutting device, large masses must be moved to and fro at short intervals, and, on the other hand, in the mechanical transmission which involves expenditures and produces additional masses. Moreover, during the mechanical transmission, the horizontal form of movement of the processing device is the same as a rule as that of the conveying device for the bottom molds; in the case of the known device the oscillating movement. Furthermore, these known devices have a tendency toward fluttering which results from the constant accelerating movement at the beginning of the operation which must, however, be stopped prior to carrying out the cutting operation.

Also conceivable are conveying means for bottom molds which operate continuously. When it is desired in such a continuous system to operate with processing slides or carriers being moved in an oscillating manner, the transformation of movement required therefor involves obviously expenditures from a point of view of continuity and oscillation.

A further disadvantage of the known systems consists in that in high-speed conveying machines the time available for the processing or treating operation is very short. The processing operation can begin only after the shocks produced during the transmission of movement from the bottom mold conveying system operating at a high conveying speed to the discontinuous processing system, for example the cutting system, have been absorbed. The operation must be terminated before the return travel of the processing system begins. Because of the shortness of time available for the processing or treating operation (in the order of tenths of seconds), the aforementioned conditions are frequently not attainable so that, for example, a warping of the cement will occur at the cutting spot in the conveying direction of the bottom mold.

SUMMARY AND ADVANTAGES OF THE INVENTION

It is therefore one object of the present invention to propose a processing device, for example a cutting device, whose drive is essentially based upon the principle of continuous rotary movement which is independent of the type of the conveying machine used, and which may be synchronized in an improved manner with respect to the travel speed of the layer of cement carried by the bottom mold.

This object is obtained, in accordance with the present invention, by means of at least two endless chains adapted to be driven simultaneously in the same direction, with at least two tools being secured between these chains and movable relative thereto for severing the material passing along thereunder. In this construction the material moves along a specific path equal in value and direction to a component of the tool movement, and includes a drive system for the circulating conveyor which is synchronously coordinated regarding the path of travel and velocity thereof which is related to the cross section of the material. Any jerky movement which frequently occurs in processing machines which operate in an oscillating manner, is effectively prevented by reason of the uniform circulation of the tools which are secured to the chains. A larger number of tools than shown herein may be secured to the chains also, if desired.

Some exemplary advantages of the present invention are as follows.

An advantageous embodiment of the present invention is characterized in that the chains, which are adapted to be driven, travel in the same horizontal plane and the cutting tools, which are movable with the chains, are secured thereto at predetermined locations on the flights of the chains. The supporting arms for the cutting tools being attached in this manner will shift during the operation or travel by means of the chain sprockets. The diameter of the chain sprockets may be chosen independently of the height of the supporting arm since a supporting arm, when it has been shifted during the return travel thereof, does not hinder those supporting arms traveling thereunder and then traveling in the cutting direction.

According to a further advantageous embodiment of the present invention, either one or several tools are displaceably secured to one supporting arm. The supporting arm may rotate readily with the chain while the tools being small and light carried thereby may be slid or shifted to and fro on the supporting arm.

It is particularly advantageous, according to the present invention, to dispose the tools on the supporting arm by way of a tool holder, guide and connecting rods. Since the supporting arm will maintain its plane during the entire rotary movement, it may be employed as reference plane, particularly as a supporting plane for the cutting tool holders, guide and connecting rods.

According to the present invention it is also very expedient that the connecting rod for the knife travel in a compression spring which is hingedly connected thereto and by means of which the connecting rod in the unloaded condition thereof is urged in a direction away from the knife, with a ball bearing being arranged at the end of the connecting rod opposite the knife. By reason of the constant reference plane at the supporting arm and by means of the guide rods, each of the cutting knives are held in parallel planes during the entire rotary movement. The connecting rod will then assure, for example, a reciprocable movement of the knives. In accordance with the present invention, this is suitably accomplished by one or several rigidly or jointedly constructed trip or stop dogs being displaceable in the longitudinal direction and/or relative to height are so disposed at the stop dog base frame that the respective connecting rod is moved with its ball bearing by the respective stop dog along a specific path counter to the pressure of the spring. The advantage of this removable stop dog is that it can be made and displaced according to the movement which happens to be desired at a given time. The displacement has the effect that the lowering action begins and is terminated either earlier or later. The substitution of short cams for long cams, for example, will provide for shortening of the lowering operation, etc. It is also possible to construct and arrange the cams in such a manner that any desired turning off and on of the movement of the tool relative to the supporting arm is rendered possible.

A further advantageous embodiment of the present invention consists in the feature that the knife may be connected with a toothed rack which is in engagement with a pinion which, in turn, cooperates with a toothed rack which follows, by way of a roller guide connected thereto, a cam curve for starting the cutting operation. In this manner, the cut of the knife may be tripped laterally with respect to the supporting arm.

According to an advantageous further development of the present invention, at least one guide rod is mounted on the supporting frame parallel to the direction of travel of the supporting arm and on each side of the latter, and on this supporting arm is mounted a bearing which is open on one side thereof for guiding the supporting arm. The specific type of suspension of the supporting arm produces as a rule resulting forces which arise due to the lever action, since inertia or shearing forces will be formed. By means of the bearings secured to the supporting arm, however, the lever forces being produced are compensated in an advantageous manner and, accordingly, transmitted to the supporting frame.

In a further advantageous embodiment of the invention, the supporting arms are hingedly affixed on the chains by means of lugs and the supporting arms are guided on the guiding components by means of cam rollers carried by the supporting arm. Thus, there is a true and exact control of the supporting arm by the guiding components which has high resistance to wear.

It is particularly advantageous to dispose, as proposed by the present invention, on one supporting arm two knives positioned at different angles in an enclosure and in such a manner that the coordinated connecting rods will be arranged in juxtaposition and in tandem. It is often desired to make a cement roof tile or brick with one straight, i.e. vertical, cutting surface and with one slanted cutting surface. It is understood that the knives are secured at different angles relative to the supporting arms which comprise the enclosure and remain in this space in the same relative position. It is possible, however, to reduce the number of supporting arms and hence the dimensions of the cutting device. For this purpose, several cutting operations are carried out from one supporting arm. The trip cams being arranged next to each other and in tandem and having an elongated configuration render it possible that the first connecting rod will initially move its coordinated knife and that after that knife has been reset, the second connecting rod will be brought into engagement with the other thrust cam to actuate its knife.

It is essential that the knife be held by frangible screws or bolts. If, due to carelessness during the operation of the cutting device, the knife should contact any stationary block, this will not result in damage to the entire installation, but only the respective knife that is involved will fall off the knife holder when the safety bolts have been broken.

When, for example, the horizontal central plane of the first chain is positioned higher than that of the second chain and one of the mounts for the supporting arm is secured at the upper end thereof to its chain and the other mount at the opposite side is secured at the lower end thereof to its chain in a rotatable and pivotal manner, this then affords the significant advantage of easy accessibility and the further advantage that the tool holders and supporting arms move in parallel planes with respect to each other. Each supporting arm including the knife and the upper end of its connecting rod occupies a certain height which must not be obstructed by that of the other supporting arm traveling thereover in the opposite direction.

Moreover, it is expedient to design the drive system for the knife carrying conveyor in such a manner that not only will the synchronous velocity thereof be assured, but also the fact that the tools will cut the material traveling thereunder at the predetermined place.

This operation is achieved by virtue of the fact that the drive system consists of an integrated force-transmitting means, as well as at least one endless chain traveling over at least two gears together with dog members which are rotatably connected to the chain and comprising suitable cogs which make contact with corresponding thrust edges provided at the bottom of the molds, and this drive unit drives both the gears for the chain flights and the conveyor in a synchronous manner. The induction clutch which is included and further described hereinbelow also affords the advantage that the conveying speed of the molds is communicated through the force-transmitting means to the knife carrying conveyor. The organization of the drive control thus has a particularly favorable effect. A contact or surface pressure between the cogs and the corresponding thrust edges which is constant but nevertheless variable and which is adapted to be regulated as desired, is thus obtained by reason of the regulation of the induction clutch. Hence a safety factor is realized by means of the synchronization of the conveying paths of the supporting molds and the later processing of the cement or treating which may be determined beforehand.

According to an advantageous further embodiment of the present invention, a sprocket chain travels over two gears, and at the circumference of this chain in approximately uniformly spaced intervals with respect to each other, there are four entraining members with each having one thrust cog of a specific length, with the entraining members accurately guided by two axles provided with rollers. Before the thrust cog carried by the entraining member will enter into full engagement with the edge portion at the bottom of the mold, it is carried by the entraining member along a short path jointly therewith out of engagement with the mold. When that particular cog is then brought into engagement to drive the mold, it will be done smoothly so that no shock or jolt will arise during the transition period between one cog no longer driving the mold and at that time when the next cog carried by the adjacent entraining member assumes the driving function. The varying length of the cogs allows for the precise determination of the point of application of the next-following thrust cog.

An advantageous further development of the present invention is characterized in that the entraining member, viewed in the direction of movement thereof, is connected to a tang which extends on both sides out of the roller chain. In accordance with the present invention it is further very suitable to secure the entraining members on two opposed flat butt straps and to guide it by means of rollers over the cam surface. In this manner the entraining member is rotatably positioned by means of needle bearings, and the travel position thereof is determined by the outer guide curves. The attachment to and support of the entraining members by the chain are then very simple and sturdy and their accurate operation can be assured with precision and without a great deal of expenditure.

It is advantageous, according to the present invention, that the dog member connected to the entraining member pin extending out of the chain on both sides thereof is hingedly connected with the chain and guided by the guide cams by means of cam rollers and the supporting rollers positioned therebehind and traveling therewith act as a further guide when in engagement with the cams. A suitable spring urges the pair of cam rollers pivotally about the entraining member pin axis at all times against the inner guide cams.

It is also proposed by the present invention that the guide cams be machined into an outer casing part which encloses the gears as well as the chain and rollers.

In accordance with an advantageous further concept of the present invention, the gear of the drive system which is positioned beneath the mechanism for depositing the cementitious material on the mold surfaces is arranged in front of the pressure nozzle so that the thrust cog of the entraining member is out of engagement with the edge portion carried at the bottom of the mold before the full pressure of the nozzle attains maximum pressure. This arrangement assures that the thrust cog of the entraining member will rest at all times against the depending edge carried by the bottom mold without pushing it forwardly so rapidly that the various bottom molds will be separated from each other, thus tearing the cement before it is cut by the circulating conveyor knives. Thus, there is provided a very compact combination of a roof tile or brick machine capable of operating at a high rate of productivity. Also, according to the present invention, the induction clutch is so designed that the bearing pressure between the thrust cog and the lip carried by the bottom of the mold is constant throughout all operating conditions and is adapted to be regulated with respect to the value thereof. This construction further provides that the molds will not be conveyed by means of the drive system under the pressure orifice and to the circulating conveyor more rapidly than is predetermined by the conveying means. The output of the drive system utilized is also sufficient to drive the dog members with the thrust cogs during idling at a higher speed than the molds travel, i.e. when they are not in engagement with the thrust edges at the bottom of the molds.

Further features, advantages and possibilities of application of the present invention will become further apparent as the description progresses.

BRIEF DESCRIPTION OF THE DRAWINGS

Further objects and advantages will become more apparent from a reading of the following detailed specification taken in conjunction with the drawings, in which:

FIG. 14 is a front view of another embodiment of a supporting arm in the cutting position; and FIG. 15 is a top plan view of the embodiment according to FIG. 14.

DESCRIPTION OF THE PREFERRED EMBODIMENTS

Figure 1:
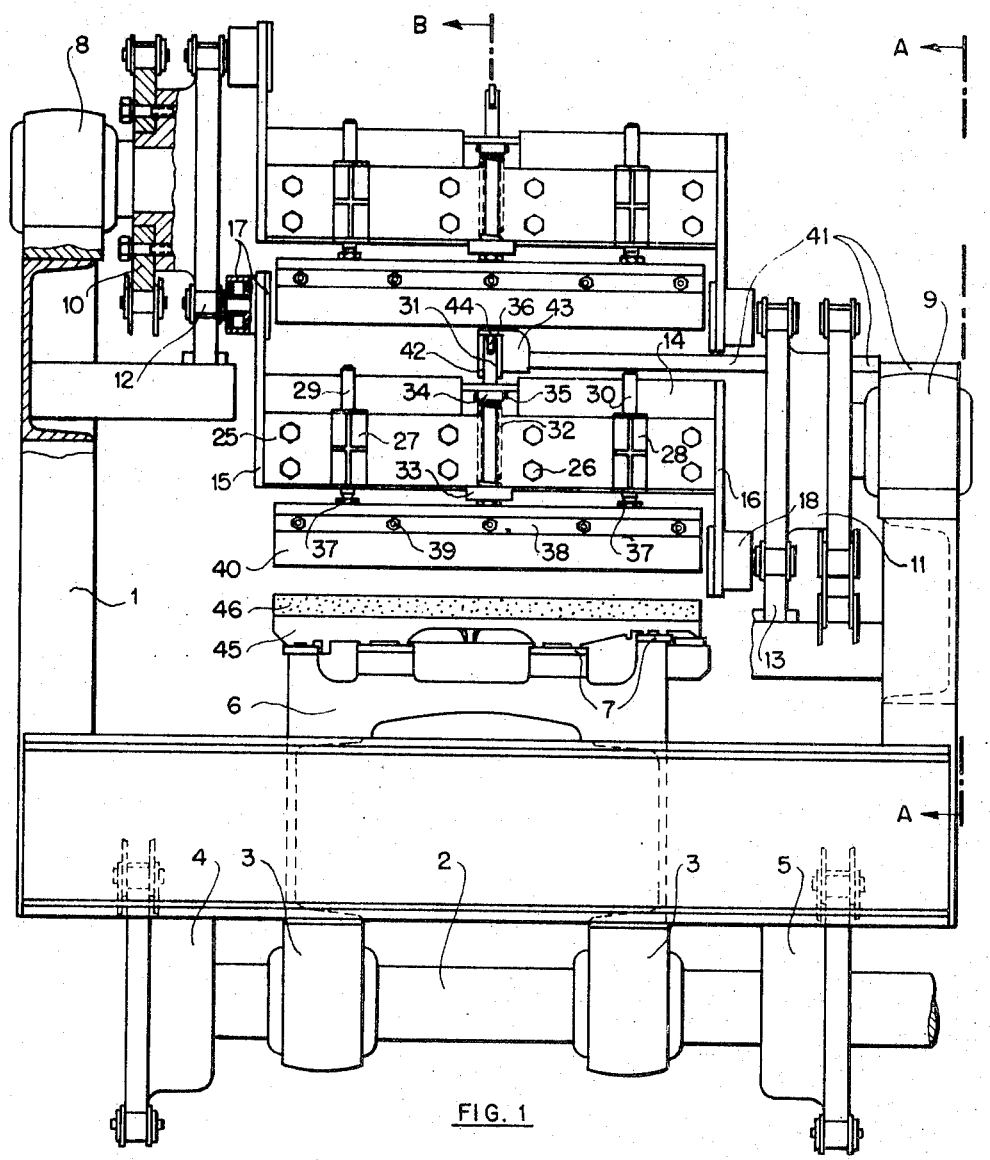
FIG. 1 is a front view partially in cross-section of the circulating conveyor.

Turning now to the drawings, mounted at the bottom of the supporting arm 1 are a drive shaft 2 by means of a bearing 3, a first chain sprocket 4 and a second chain sprocket 5, approximately in the center at a bench 6, sliding guides 7 and, at the top, two upper bearings 8, 8' (only one shown) as well as on the right hand side two lower bearings 9, 9' (only one shown). The upper chain sprockets 10, 10' (one not shown) is supported on the bearing 8, 8', and the lower chain sprockets 11, 11' (one not shown) is supported on the bearing 9, 9'. The upper chain 12 travels on the upper chain sprockets 10 and 10', and the lower chain 13, which in this case is a stud bearing chain, travels on the lower chain sprockets 11 and 11' (one not shown). Secured between the two chains are four supporting arms and at an equidistant interval with respect to each other four knives. Two of these are illustrated in FIGS. 1 and 2 (in a front view and in a side view, respectively), partially in cross-section.

Figure 2:
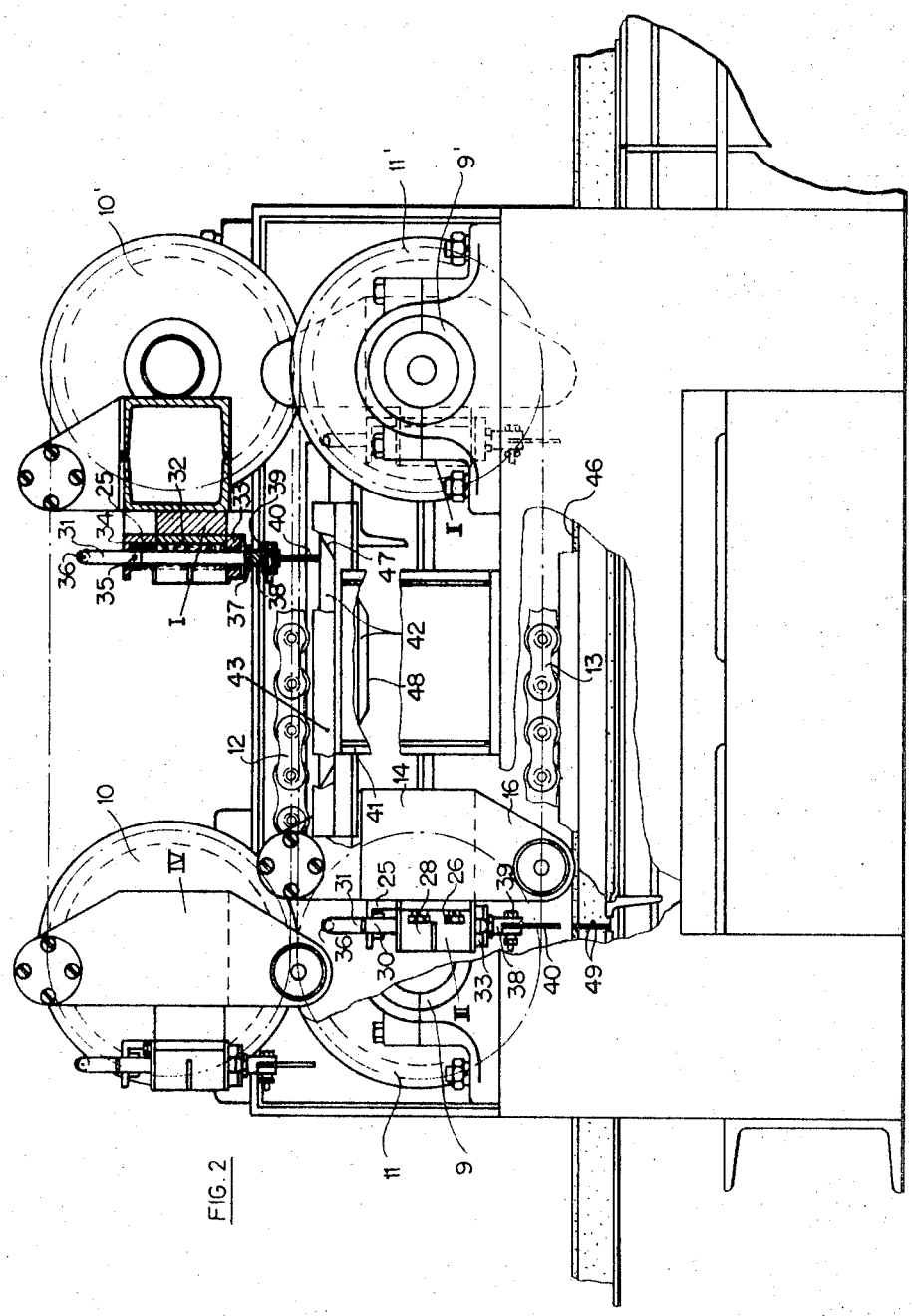
FIG. 2 is a side elevational view of the circulating conveyor partially in cross-section taken along lines A—A and B—B of FIG. 1, wherein some elements have been cut away to allow for a better view.
Figure 3:
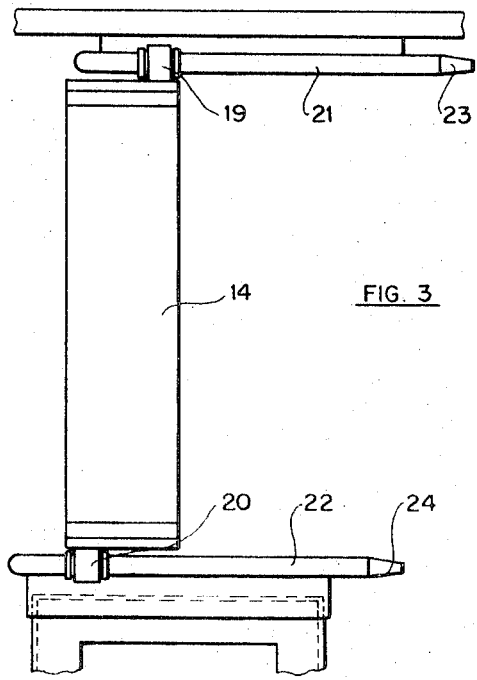
FIG. 3 is a top plan view of the supporting arm guide within the zone of the cutting operation.

Since all four of the supporting arms have the same construction in this device, the individual elements thereof will be described on the basis of a supporting arm 14. When viewing particularly FIG. 1 in conjunction with FIG. 2, the construction is particularly apparent therefrom. The supporting arm 14 is provided on both sides thereof with connections 15 and 16 for the stud chains. One stud or pivot bearing group 17 is secured at the top left to the connection 15, and one pivot bearing group 18 is secured to the connection 16 at the bottom right. The supporting arm 14 is thus supported and guided on the left upper side by the upper stud bearing chain 12 and on the lower right side by the lower stud bearing chain 13. In order to absorb the lever forces arising as a result of this construction, particularly during the cutting operation, the supporting arm 14 is guided on two guide rods 21 and 22 — as is particularly apparent from FIG. 3 — by means of two bearings 19 and 20 which are provided in this case as friction sleeve bearings being open on one side thereof.

The two guide rods, as also are the two bearings 19 and 20 viewed in the direction of the cutting operation, are offset with respect to each other. It is particularly advantageous to provide each of the front sides of the guide rods 21 and 22 with a cone-shaped portion 23 and 24 so that the bearings 19 and 20 are centered when running up onto the guide rods. The guide rods 21 and 22 are provided only in that area, i.e. they come only into engagement with the bearings 19 and 20 of the supporting arm 14, in which the cutting operation takes place. The cutting operation obviously may take place also on a shorter path. It must, however, begin only after the guide rods 21 and 22 have entered the bearings 19 and 20 and must be completed when the bearings 19 and 20 will once more leave the guide rods. This measure is sufficient since considerable lever forces that have to be compensated for arise as a rule only during the cutting operation.

FIG. 1 illustrates that a knife base guide plate 25 is secured by means of bolts 26 to the supporting arm 14. On the sides of the knife guiding base plate 25, in turn, are mounted to the right and left, slotted bearing blocks for ball bearing sleeves 27 and 28. Guided therein are the guide rods 29 and 30. The connecting or thrust rod 31 is disposed medially of the two guide rods 29 and 30 and the knife guiding base plate 25. The rod 31 is encircled by the lower end thereof with a compression springs 32 and is arranged to cooperate therewith. The spring 32 is seated at the bottom on a plate 33 and rests at the top thereof against an abutment 34 which is secured in place with a transverse key or pin 35. The thrust or connecting rod 31 carries at the upper end thereof a roller means 36.

Holding screws 37, which are secured at the bottom to the supporting arm 14, are provided with the blade holder 38. The blade 40 is secured thereto by way of suitable bolts 39.

The supporting frame 1 further supports the trip cam mount base 41. The trip cam or cams 42 are secured over the trip cam guide 43 to the trip cam mount base 41. As can be particularly well seen from FIG. 2, the trip cams 42 are of an elongated shape. They may be offset with respect to each other in juxtaposition, in tandem and obliquely to enter into engagement with the rod or rods 31, or 31' when the supporting arm passes under the trip cam mount base 41. As already indicated hereinabove, preferably an elongated slot is machined on top of the trip cams which allows for a longitudinal sliding of the trip cam to or fro, and it is adapted to be firmly bolted into place in the desired position. The bolt, which is suitable therefor, is indicated at 44 in FIG. 1.

Figure 9:
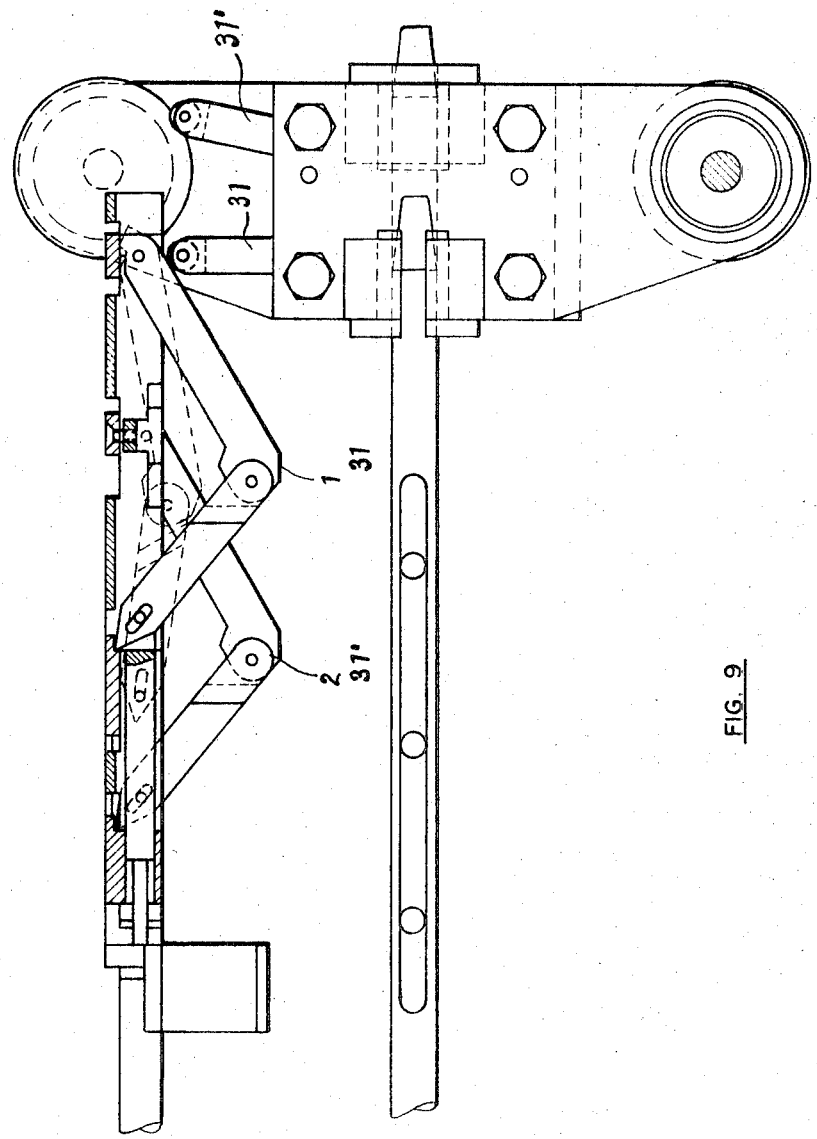
FIG. 9 illustrates another embodiment of an articulated construction of the trip cam.

FIG. 9 illustrates trip cams constructed in an articulated fashion. Two articulated levers are moved against a stationary bearing by means of a pneumatic device. As a result, any desired switching on and off of the movement of the knife or blade relative to the supporting arm is thereby feasible.

Figure 4:
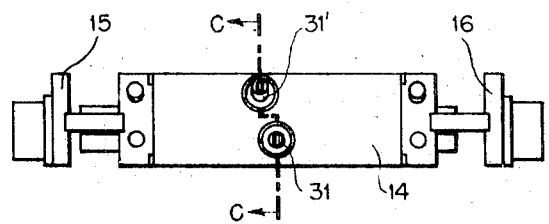
FIG. 4 is a top plan view of a supporting arm with two connecting rods and knives.
Figure 5:
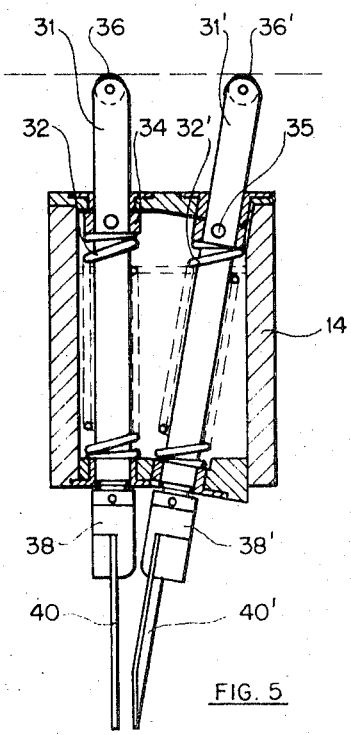
FIG. 5 is a cross-sectional view of the supporting arm of FIG. 4 along line C—C.

FIGS. 4 and 5 illustrate in principle the same supporting arm 14 with thrust rods 31, 31', compression springs 32, 32', and blades 40, 40'. As compared to the construction of the supporting arm described above comprising the knife guiding base plate 25, the construction is, however, slightly different in a supporting arm for the support of two connecting or thrust rods which, as is particularly apparent from FIG. 5, are disposed at relatively different angles. This supporting arm construction is, however, also based essentially on the same principle set forth in the present invention.

When the apparatus for manufacturing of cement roof tiles is put in operation, the conveying device (not shown) will push the bottom half molds 45 with the cement 46 on top of them (FIG. 1) along the guideways 7 and under the synchronously-operated circulating conveyor. Over the drive shaft 2, chains 12 and 13 are driven concentrically so that the blades 40 and their supporting arms 14 arranged therebetween, are traveling, at least in the area of the cutting operation, along the path provided with guide rods 21 and 22, at a speed which coincides exactly with the amount and direction of the extrusion velocity of cement 46. After the blade 40 has been moved from the position shown as I in FIG. 2 toward the right and downwardly into the position shown in dashed lines at II, the roller 36 of the shifter rod 31 will run up against the chamfered edge portion 47 of the cam 42 and will be lowered downwardly jointly with the guide rods 30 and the blade 40 against the pressure of the spring 32. Now, by way of example, let it be assumed that the conveying direction of the bottom molds and of the cement layer is toward the left in FIG. 2. The blade 40 then penetrates into the cement layer 46 at an accurately predetermined point, i.e. where two portions of the bottom molds abut each other. During this operation, it will be apparent that the cement layer and the knife travel at the same speed, as has been set forth above. Once the knife 40 has reached the position which has been defined with III in FIG. 2, the thrust or connecting rod 31 is now out of engagement with the cam 42 and has been pressed into the upper idling position by the compression spring 32. It is understood that the knife 40 during the passage along the edge 48 of the cam 42 remains lowered into the layer. The cut edges of the cement resulting from the severing operation have been identified with reference numeral 49 in FIG. 2. The distance of the chain sprockets between 10 and 10' and between 11 and 11' is greater than the distance between the cut edges 49 produced as a result of the cutting operation, namely, the front and rear edge at one bottom mold. While the supporting arm travels from the position defined as III into the direction marked as IV, another knife carried by its supporting arm is just preparing to begin the next following cutting operation since that knife has now at that time reached the position II. The procedure is thus repeated constantly in a continuous synchronous manner.

When the supporting arm 14 of FIGS. 4 and 5 is employed, for example, the thrust rod 31 runs initially up against the cam 42, then executes the cutting operation, lifts off, and after a certain period of time the operating procedure begins by way of the second thrust rod 31' and a second cam (not shown in the drawing). As has already been indicated hereinabove, the device or unit may be enlarged at will so that the circulating conveyor comprises six or more supporting arms. The cutting operation may also proceed in a manner such that the straight knife or blade 40 secured to the thrust rod 31 executes first a straight cut and thereafter the canted knife or blade 40' being disposed on the same supporting arm executes at the supporting rod 31' an oblique cut.

Figure 6:
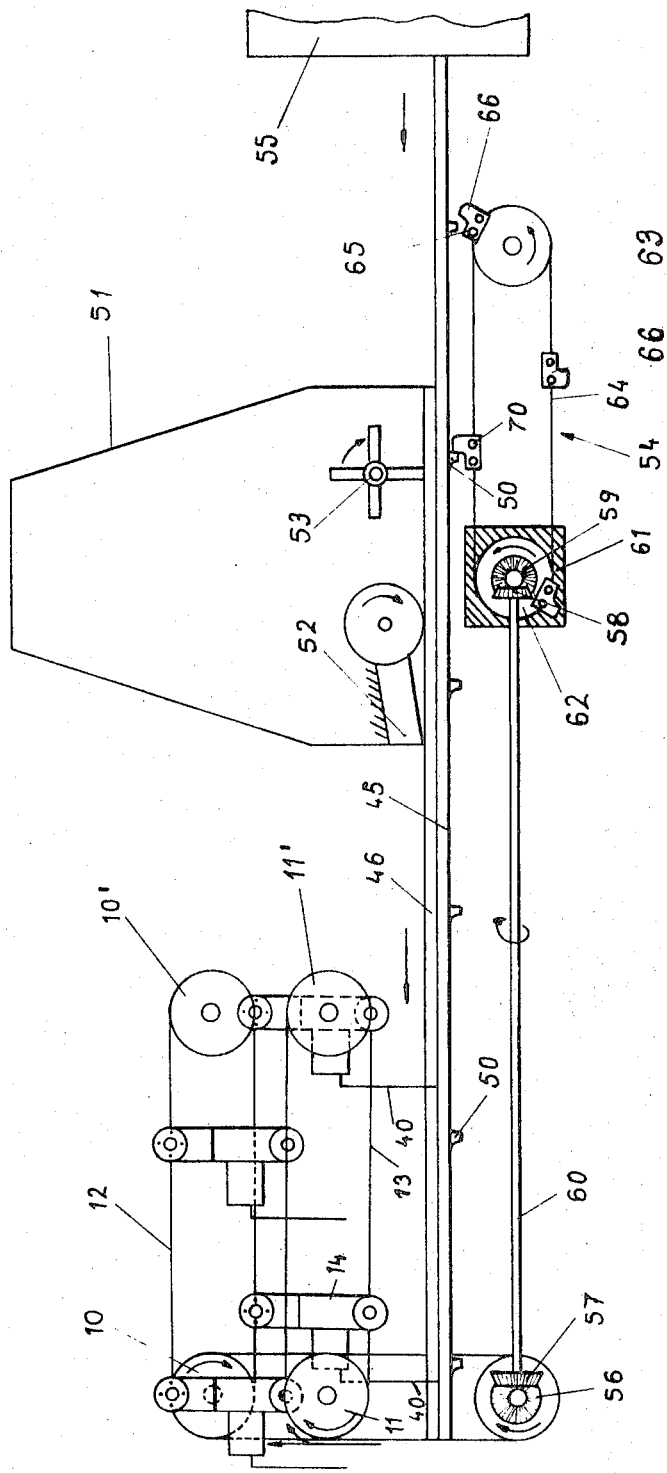
FIG. 6 is a schematic illustration of the entire unit inclusive of the circulating conveyor and the drive system.

So far only the circulating conveyor itself has been described. The drive and the control thereof are carried out by way of the drive system referred to hereinabove. An outline of the arrangement of circulating conveyor, drive system, pressure orifice and cement pouring funnel has been shown in FIG. 6. To the left of this figure there are visible the forwardly positioned lower chain sprockets 11, 11', the rear upwardly mounted chain sprockets 10, 10', the upper flight of chain 12, the lower flight of chain 13, between which the four supporting arms 14 are rotatably secured with the knives or blades 40 being accommodated thereon. The lower two knives are as shown in this view in engagement with the layer of cement 46 so as to cut it at the places where two bottom molds 45 abut against each other. The forwardly disposed bottom mold carries at the rear end thereof the thrust nose or pusher element 50. Visible in the center of FIG. 6 is the cement pouring or filling funnel 51 with the pressure nozzle or orifice 52 with a rotatably mounted spiked device driven by shaft 5 53. Disposed therebelow is the drive system which has been identified generally by numeral 54. Shown in the right-hand third of the figure is a box 55 broken off at the right side thereof which represents the conveying device (not further described) which provides for the main advance thrust of the bottom molds 45.

As has been set forth above, the drive and the control of the circulating conveyor are carried out by means of force-transmitting means, such as for example bevel gears 56–59, transverse shaft 2, and longitudinally disposed shaft 60, as well as transmissions, and the clutch and motor which are shown schematically by the shaded box and indicated by numeral 61.

The bottom molds 45, which are provided with the nose portion 50, move, as illustrated in FIG. 6, from the right hand side under the cement pouring funnel 51, and there receive the cement layer 46 which is compressed by the pressure orifice 52. The main frictional force, i.e. resistance force, which counteracts the thrust force produced by the conveying device 55, is developed under the pressure orifice 52.

The drive system 54, which consists essentially of two gears, the front gear 62 and the rear gear 63, as well as an endless chain 64 entrained over these gears with the traveling dog members 65 secured thereto and having integral thrust cogs 66, is so arranged under the line of the bottom molds that the gear 62 viewed as being disposed forwardly in the direction of movement, is disposed under and ahead of the pressure orifice 52. The motor represented by the box 61, inclusive of clutch and transmission, drives, on the one hand, the drive system 62, 63, 64 and, on the other hand, by means of the shaft 60, the circulating conveyor. The transmission system (motor, induction clutch, transmission) identified with reference numeral 61 is relatively flexible whereas the driven device (from the synchronization drive toward the circulating conveyor) transmits directly, without play in the transmission, the movements of the synchronizing thrust cogs to the blades which must be synchronized. The control is effected by means of the induction clutch which is disposed between the motor and the forwardly arranged gear 62 and which transmits just as much torque, i.e. output, that on the one hand the circulating conveyor can be driven, and, on the other hand, the traveling or dog members 65 assure a certain pressure on the dog member and the edge 50 of the mold.

Figure 7:
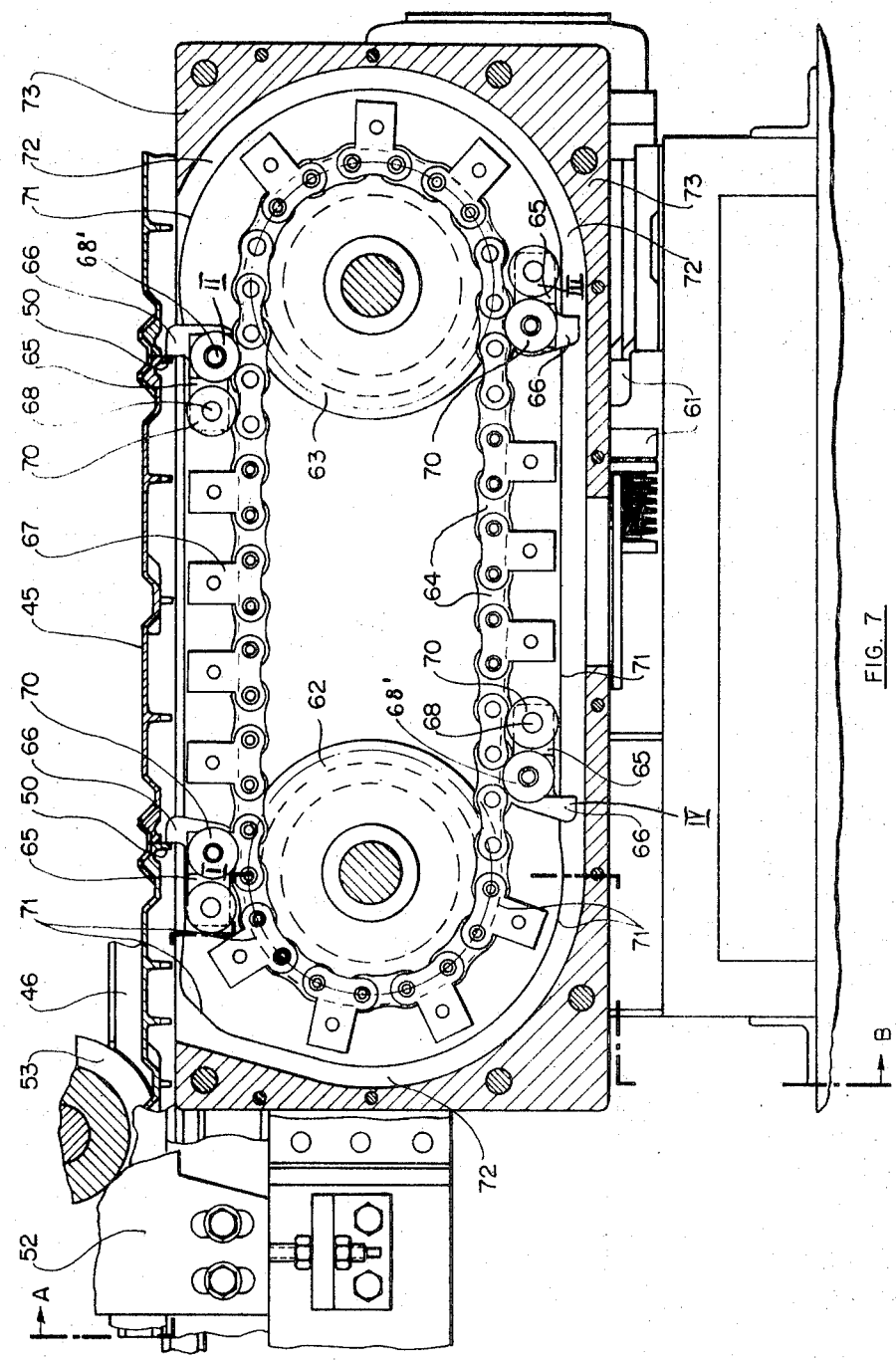
FIG. 7 is a longitudinal cross-sectional view through the drive system taken along line D—D of FIG. 8.
Figure 8:
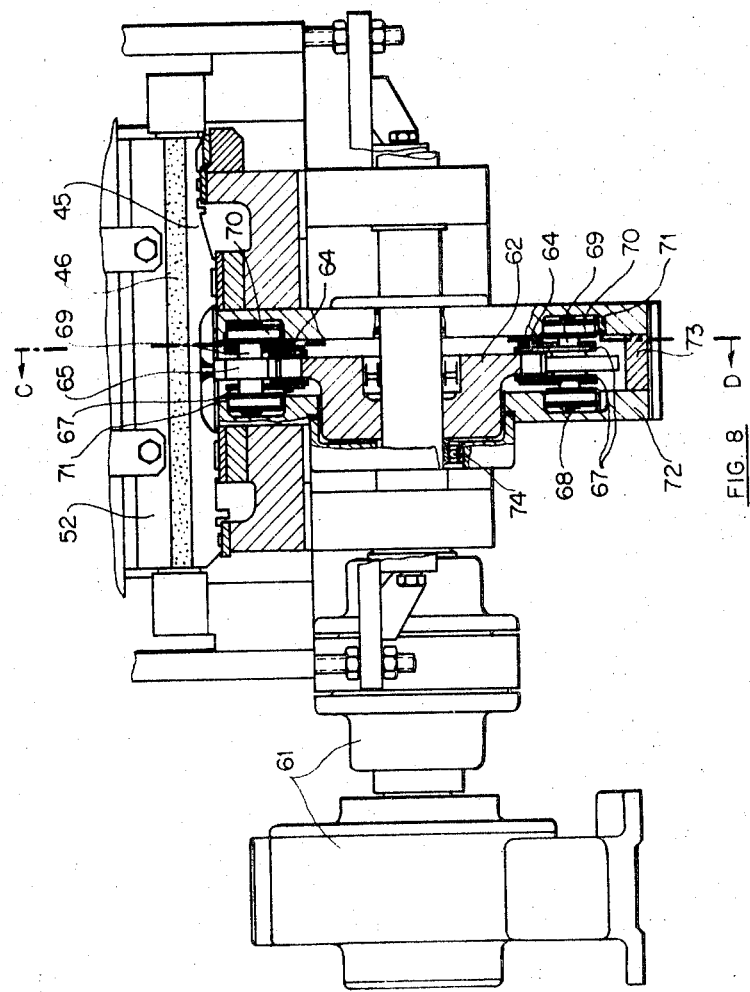
FIG. 8 is a cross-sectional view of the drive system taken along line E—E of FIG. 7.

The drive system is illustrated in greater detail on the basis of the longitudinal cross-sectional view given in FIG. 7. The steel side bar or sprocket chain 64 carries in each case flat juxtaposed butt straps 67 between which are entrained and rotatably secured dog members 65 by way of axles 68'. See also FIG. 8. The dog members 65 consist of an essentially L-shaped portion with a thrust cog 66 whose configuration is clearly apparent from FIG. 7. The chain construction and particularly its length must consist of multiple integers of the length of the molds. Spacer sleeves 69 (FIG. 8) maintain the correct distance between the rollers 70 and the entraining dog member 65. Each dog member carries four rollers. The movement thereof controls the extension and retraction of the thrust thumbs or cogs 66 under the corresponding thrust nose. The rollers 70 travel along inner and outer guide cams 71 which control the movement of the entraining members in an accurately predetermined fashion. The housing of the drive system consists of an outer part 72 and an inner part 73. The guide curves or cams 71 are machined into the outer part 72. It has already been mentioned hereinabove that the outer part serves several functions simultaneously, i.e. control of the dog members including the thrust cogs by means of the guide curves of the cams, as well as support of the bearings 74 and that of the gear 62 and 63, respectively, thus providing protection against outside influences and accidents. A frame, which among other things supports the sliding guide, a lateral plate for supporting and moving the pressure orifice, and of the toothed or spiked device carried by shaft 53, and other structural elements necessary to operation are rigidly connected to the outer part 72.

When the entire installation (FIG. 6) has been placed into operation the molds at the right move out from the conveying means 55 toward the left and constitute a moving support. Cement is filled into the pouring funnel and the moving support is initially stopped once more for an instant. Thereupon the motor of the drive system is turned on so that the chain 64 with the dog members 65 and simultaneously the supporting arms 14 together with the cutting means and, respectively, knives 40 of the circulating conveyor will begin to run. The thrust cogs 66 of the dog members 65 are now brought into contact with the thrust noses 50 of the bottom molds, 45 and will come to rest thereagainst without moving the bottom molds in the cement. The induction clutch is so set that the thrust cogs 66 will remain resting against the thrust noses 50, even when the conveying device 55 rapidly starts the moving support.

The line of the molds extends to the left until in a position under the pouring funnel 51 and under the pressure orifice 52, with the aid of which the now successively inflowing cement is compressed. As already set forth above, the frictional resistance for compressing the cement under the pressure orifice 52 is considerable. The thrust output of the motor defined by numeral 61 would normally not suffice for the further conveying of the filled molds toward the left hand side; thus, this operation is taken over by the conveying means 55. The velocity adjustment of the thrust cogs 66 is matched to that of molds 45 which are guided in a line and consequently to that of the thrust noses 50 and takes place by means of the induction clutch. For all of the operating conditions, the induction clutch tranmits only as much output to the drive system and to the circulating conveyor that constantly and approximately the same bearing or contact pressure is assured between the thrust cog and the thrust nose. It is understood that as a result the dog members, as well as the blades 40 of the circulating conveyor, rotate at all times at a speed consistent with the movement of the molds 45 as they move toward the left in the view in FIG. 6. As in the case of the circulating conveyor, where the knives 40 travel together along a certain path, the same is true also in the case of the drive system. In FIG. 7 the four dog members have been shown in different positions marked I to IV. In order that no shock or jolt will be produced during the travel of the molds and hence no cutting disalignment or shifting within the cement layer occurs, the dog member I travels through a short path jointly with the dog member shown in position II. While the bearing force of the thrust member shown at I is reduced to zero, the thrust member shown at II now assumes the full force of moving the mold. The pair of rollers viewed in front in the direction of movement in FIG. 7 is lifted off upwardly by the cam surface 71 so that the thrust cog 66 is brought downwardly out of engagement. The guide cam 71 will consequently urge the pair of front rollers downwardly once more so that it will finally reach the position marked as IV. The same procedure will be repeated between the dog members which have been defined as II and III.

Figure 10:
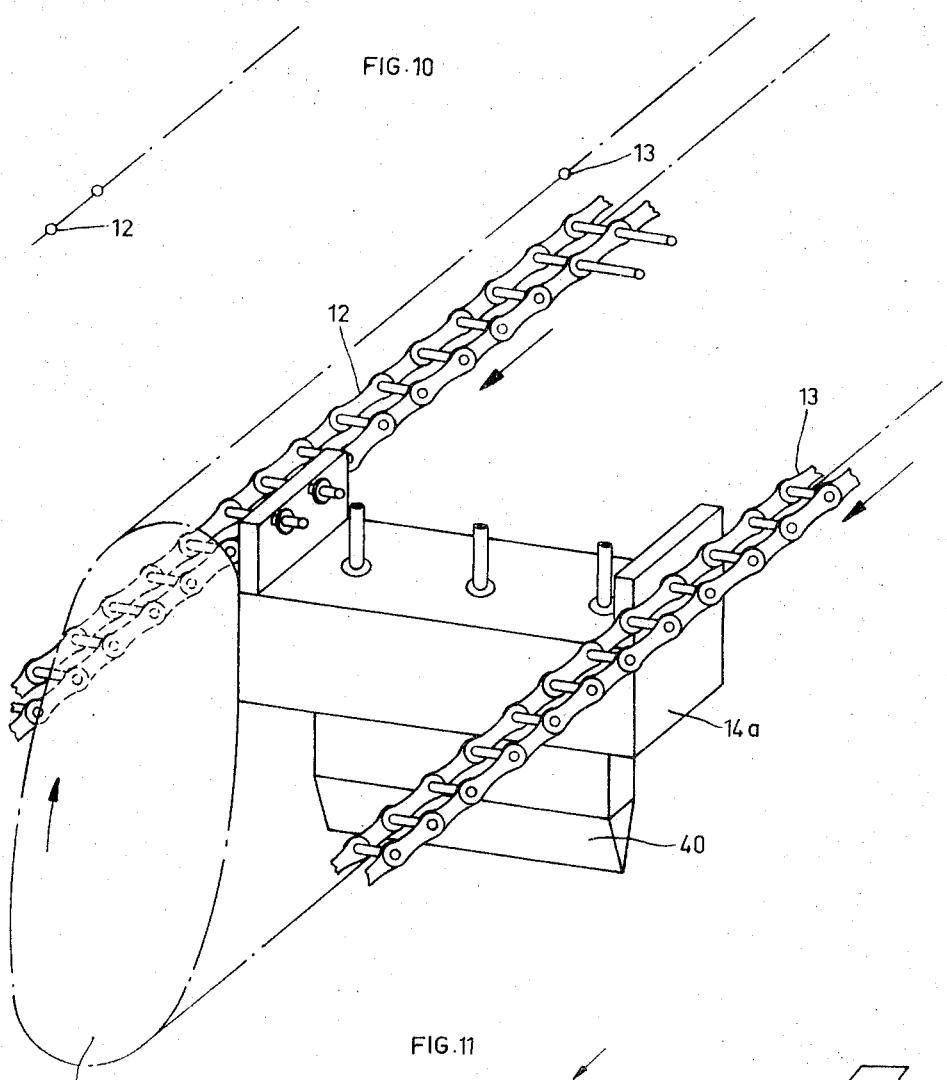
FIG. 10 is a schematic perspective view of a conveyor with spaced flights of chains positioned in the same plane and also showing the supporting arm.

FIG. 10 shows an embodiment for a circulating conveyor with flights of the chains 12, 13, being disposed at the same height. A supporting arm 14a is connected to the chains — as illustrated in greater detail in FIGS. 14 and 15 — and will be reversed when the chains travel over the chains sprocket 10, 11. The advantage of a shifting supporting arm resides in that the diameters of the chain sprockets 10, 11 can be selectee independently of the height of the supporting arm 14a since a supporting arm, once it has been reversed during the return travel thereof, will not hinder the other supporting arms trveling thereunder in the cutting direction.

Figure 11:
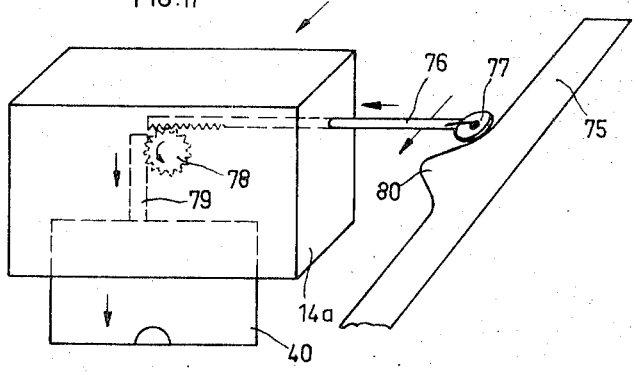
FIG. 11 is a perspective view of another embodiment of the invention showing a further actuation means for the cutter.

FIG. 11 illustrates schematically an embodiment for the lateral actuation of the cutting movement of the knife or blade 40. A guide cam 75 extends longitudinally in the direction of movement of the supporting arm 14 and is arranged to cooperate with a roller 77 carried by rod 76. The free end or rod 76 is provided with a rack of teeth which cooperates with a pinion 78. The toothed rack carried on bar 79 which supports the blade 40 is positioned in a plane normal to rack on bar 76. When the roller 77 travels over the projection 80 in the guide curve or cam 75, the pinion 78 is rotated in the direction of the arrow, and a cutting operation of the blade 40 is performed. Rod 76', although not shown, is subjected to a spring pretension so that it is constantly urged against the guide cam 75.

Figure 12:
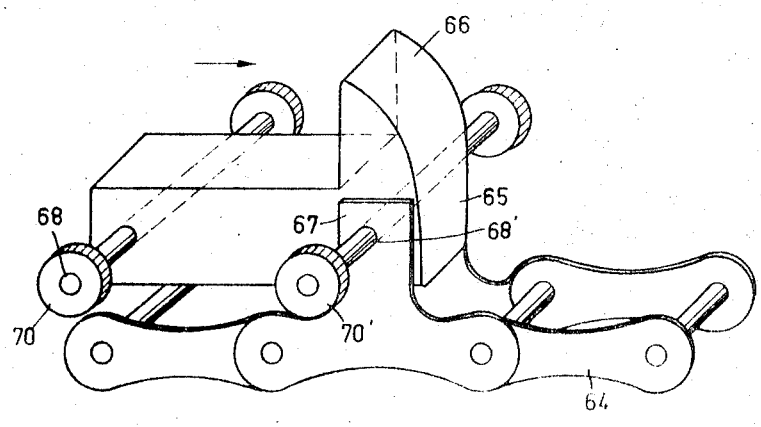
FIGS. 12 and 13 are perspective views of a dog members connected to a portion of chains.
Figure 13:
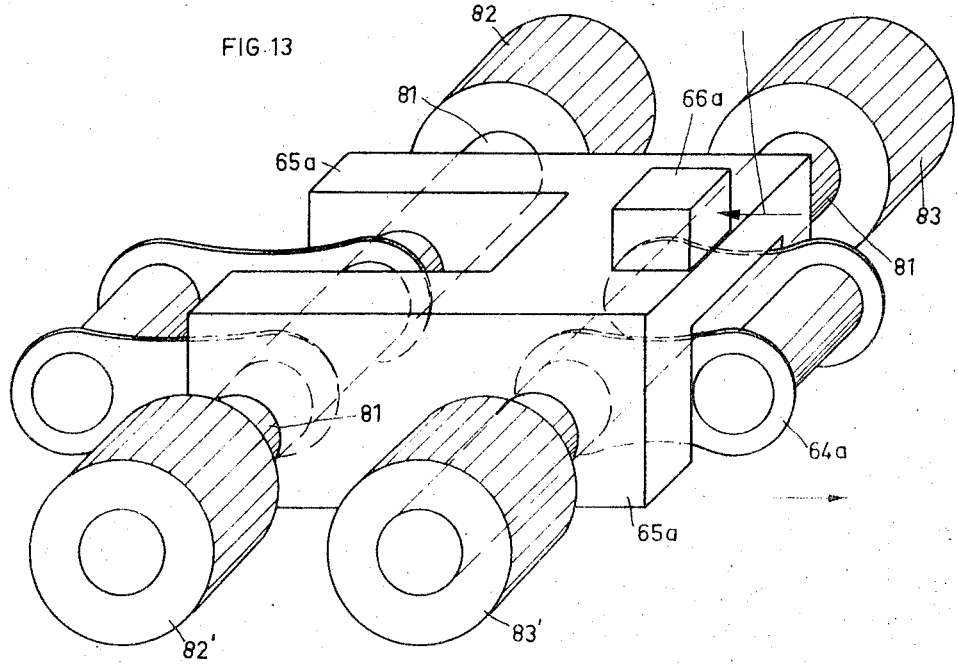

FIGS. 12 and 13 illustrate in perspective views dog members connected to chains. The dog member of FIG. 12 has already been referred to at length in the discussion concerning FIGS. 7 and 8. The arrows indicate the direction of movement of the dog member and the direction of the force which acts upon the thrust cog 66 of the dog member.

FIG. 13 shows a further embodiment according to the present invention wherein the dog member 65a is rotatably connected to a dog member pin of the chain 64a. Viewed in the direction of movement, the dog member in FIG. 12 operates in a leading manner with respect to its kinematic course of movement. It is evident from the direction of force, as far as FIG. 12 is concerned, that the front rollers rest against the inner guide cams 71. As compared thereto, the dog member 65a shown in FIG. 13 operates in a lagging or trailing manner viewed in the direction of movement. This dog member has the advantage of a low structural height. The supporting rollers 83, 83' and 82, 82', respectively, rest against the outer and inner guide cams 71 which are provided and are analogous to those shown in FIG. 8. In order to obtain a clear course of movement also outside of the force gearing range at the dog member, the pair of rollers are pivotable about the dog member axis and may at all times be pressed by means of a thigh spring (not shown herein) either against the outer guide cams (FIG. 12) or against inner guide cams (FIG. 13).

FIGS. 14 and 15 illustrate an embodiment for the provision of a supporting arm 14a by means of chains 12 and 13. The supporting arm 14a is connected at one side to the chain 12 by means of the dog member 85 and pins 91 and 92 and at its other side by dog members 85' and pins 91' and 91' to chain 13. FIGS. 14 and 15 illustrate the guide or cam rollers 86, 86'87, 87'88, 88'89,89'89''89'''88''88''' being connected to the supporting arm produce a moment absorbing unequivocal guide of the supporting arm at the guide parts 90 and 90' within the treating range of the tool, this guide being not as susceptible to wear and tear and adapted to be repeatedly used at all times in the same manner.

That which is claimed is:

1. In an apparatus for molding flowable material and cutting it into strips of predetermined length, the combination comprising, means for feeding in seriatim an array of juxtaposed mold portions in a horizontal plane, means for depositing on said traveling mold portions a layer of hardenable material, means adjacent said depository for compacting said material, plural endless conveyor flight means positioned above the horizontal plane in spaced vertical planes, each conveyor flight means having an upper and lower vertically spaced conveyor flight including mounting means with the upper flight of one conveyor flight means and the lower flight of the other conveyor flight means being in a horizontal plane, carrier means extending between the conveyor flight means, said carrier means including mounting means at each of its ends which engage with the mounting means of a respective conveyor flight, vertically reciprocable blade means carried by said carrier means, drive means for the conveyor means for traversing said blade means longitudinally of the horizontally moving mold portions and drive means for synchronizing the application of said layer on the mold portions with the cutting operation to form separated, independent articles.

2. In an apparatus as claimed in claim 1, wherein the carrier flight means is provided medially along its length with means to actuate said reciprocable blade means.

3. In an apparatus as claimed in claim 2, wherein said means disposed between the plural endless conveyor flight means includes means to actuate said reciprocable blade means.

4. In an apparatus as claimed in claim 3, wherein the means arranged to actuate said blade means includes a longitudinally extending cam means and rack and pinion means.

5. In an apparatus as claimed in claim 1, wherein the carrier means is demountable relative to said plural conveyor flight means.

6. In an apparatus as claimed in claim 1, wherein the carrier means is provided with plural independently operable blade means.

7. In an apparatus as claimed in claim 6, wherein said plural bladed carrier means cooperate with control means to prevent actuation of the respective blades.

8. In an apparatus as claimed in claim 6, wherein said independently operable blade means are actuated in sequence.

9. In an apparatus as claimed in claim 1, wherein the means for feeding the mold portions in a horizontal plane includes endless drive means.

10. In an apparatus as claimed in claim 9, wherein the endless drive means includes further means cooperative with cam means.

11. In an apparatus as claimed in claim 1, wherein the reciprocable blade means are secured to said carrier means by frangible means.

* * * * *